United States Patent
Dietz et al.

(10) Patent No.: US 7,337,126 B2
(45) Date of Patent: Feb. 26, 2008

(54) METHOD, APPARATUS AND COMPUTER PROGRAM PRODUCT FOR TECHNOLOGY COMPARISONS

(75) Inventors: Timothy Alan Dietz, Austin, TX (US); Ira R. Forman, Austin, TX (US); Carol Angela Logan, Austin, TX (US); Nadeem Malik, Austin, TX (US); Subhash Rasiklal Vohra, Round Rock, TX (US); Charles Gorham Ward, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1310 days.

(21) Appl. No.: 09/935,413

(22) Filed: Aug. 23, 2001

(65) Prior Publication Data

US 2003/0040923 A1  Feb. 27, 2003

(51) Int. Cl.
*G06F 17/30* (2006.01)
(52) U.S. Cl. ................... 705/10; 705/1; 705/7
(58) Field of Classification Search ............... 705/10, 705/1, 7
See application file for complete search history.

(56) References Cited

U.S. PATENT DOCUMENTS

| | | | | |
|---|---|---|---|---|
| 5,765,138 A * | 6/1998 | Aycock et al. | ............... | 705/7 |
| 5,893,098 A * | 4/1999 | Peters et al. | ............... | 707/10 |
| 6,301,574 B1 * | 10/2001 | Thomas et al. | ............... | 707/1 |
| 6,751,650 B1 * | 6/2004 | Finch et al. | ............... | 709/203 |
| 6,826,540 B1 * | 11/2004 | Plantec et al. | ............... | 705/10 |
| 6,865,581 B1 * | 3/2005 | Cloninger et al. | ....... | 707/104.1 |
| 6,952,679 B1 * | 10/2005 | Pulford | ............... | 705/7 |
| 7,130,802 B1 * | 10/2006 | Mehregany et al. | ........... | 705/1 |
| 2002/0007303 A1 * | 1/2002 | Brookler et al. | ............... | 705/10 |
| 2002/0029154 A1 * | 3/2002 | Majoor | ............... | 705/1 |
| 2002/0119433 A1 * | 8/2002 | Callender | ............... | 434/322 |
| 2002/0120491 A1 * | 8/2002 | Nelson | ............... | 705/10 |
| 2002/0184265 A1 * | 12/2002 | Gupta | ............... | 707/513 |
| 2003/0088452 A1 * | 5/2003 | Kelly | ............... | 705/10 |

OTHER PUBLICATIONS

Fisher, Charles E. How to manage vendor relationships. Security Management. Aug. 1999. vol. 43, Iss. 8, p 123, 4 pages (from proquest).*

(Continued)

*Primary Examiner*—Beth Van Doren
*Assistant Examiner*—Johnna Loftis
(74) *Attorney, Agent, or Firm*—Duke W. Yee; Gregory M. Doudnikoff; Peter B. Manzo

(57) ABSTRACT

In one aspect, a method for comparing suppliers includes sending survey questions for receipt by supplier computer systems. Programming instructions are also sent for receipt and execution by the supplier computer systems, The programming instructions are for causing the supplier computer systems to return supplier survey answers to a server. The answers are included in responding documents and are defined in a certain format as data elements included in the responding documents. The data elements are then parsed from the responding documents responsive to predetermined programming instructions and evaluated the data elements responsive to a predetermined set of rules.

4 Claims, 7 Drawing Sheets

OTHER PUBLICATIONS

Carbone, James. Evaluation programs determine top suppliers. Purchasing; Nov. 18, 1999; 127, 8; ABI/INFORM Global p. 31. (from proquest).*

Gil, Reynaldo. New trends in business force re-evaluation of supplier relationships. Frontline Solutions; Jun. 2001, vol. 2, Iss. 6-29. (from Proquest).*

Hayes, Glenn E. World Class Vendor Quality. Quality. Jun. 1986. vol. 25, Iss. 6; abstract (from proquest).*

Pettit, Robert E. Vendor Evaluation made Simple. Quality Progress. Mar. 1984. vol. 17, Iss. 3. abstract (from proquest).*

* cited by examiner

METHOD, APPARATUS AND COMPUTER PROGRAM PRODUCT FOR TECHNOLOGY COMPARISONS

BACKGROUND

1. Field of the Invention

This invention concerns a method, apparatus and computer program product relating to comparing capabilities or resources, such as software technology, of prospective suppliers, and more particularly to automated comparison using network delivery of surveys.

2. Related Art

In today's marketplace there are a multitude of divergent implementations of similar technologies. Particularly with regard to software technology, development and availability of international and industry standards lag far behind in satisfying the need for common technology implementations. Organizations ("evaluators") seeking suppliers of technology such as software face a daunting task when they undertake to identify suppliers who currently share similar technology implementations and strategies with the evaluator or one another, or are at least willing to adopt a future technology road map or strategic direction in common with that of the evaluator. Consequently there is a need for a highly organized and automated way to collect technology information from suppliers and efficiently evaluate the information, such as by comparison to the evaluator's own technology requirements.

SUMMARY OF THE INVENTION

The foregoing need is addressed in the present invention by acquiring information via survey from candidate suppliers in a given technology area. In one aspect, this is performed using web portal and messaging mechanisms so that the survey is deliverable and usable in an implementation and browser independent manner. XML or similar mechanisms are employed to accomplish this. The survey itself can be rendered by a Java applet in a browser of a potential supplier.

The questions for the survey are both generic and technology specific in nature. The generic survey questions are about development processes, quality, enterprise information, high level architecture (e.g., platform, operating system environment, etc.), and other areas. The technology specific questions are predetermined and inserted into the survey. One way the questions are compiled is by canvassing the evaluator organization intra company technologists in the given technology areas, in order to understand desirable features and functions and the priority of each. Another way this is accomplished is by obtaining a consultant report covering the technology area and use its list of technology features and weightings.

Once the survey is prepared, it is distributed, preferably online, but not necessarily, to candidate suppliers who provide offerings in that technology area. Suppliers are predetermined by mechanisms such as consultant reports, web searches, or consultation with internal company experts, or a combination of such mechanisms. Suppliers are typically contacted prior to sending the survey in order to better understand the purpose of the survey and to ensure that they are completed by the appropriate personnel. The survey is then returned to the evaluator organization, which completes an information acquisition-processing exercise.

Specific survey questions and rules are also input by the evaluator. The evaluator inputs to the survey questions represent and define evaluator requirements or preferences of the evaluator's organization. In addition, the evaluator prepares a set of rules for evaluating the survey data.

Next, a comparisons are performed, according to which the answers in the responses from suppliers are evaluated by comparing them to the evaluator answers. The data from the surveys are processed following the predetermined rules. The rules for the different areas of the survey are specific to that part of the survey. For example, there is a subset of the rules to process data from the software development process portion of the survey. Another subset of the rules is used to process data from the enterprise portion of the survey. Yet another subset of the rules is employed to judge the technology data portion of the survey.

Some rules are virtually invariant. For example, the set of questions for the enterprise portion of the survey typically is not subject to much change, and thus the processing of the data in that part of the survey is usually the same for all suppliers. For example, revenue data is treated the same way and compared the same way among responding candidate suppliers. Thus, the enterprise portion tends to be a data-driven portion of the survey.

Other aspects of the rules vary according to the way the evaluator organization wants to judge the returned data on a case-by-case basis. For example, the evaluator organization may give more weight to the technology portion of the survey than the development process portion, or may want to perform a sensitivity analysis of the data in one or more portions of the survey. By specifying such rules, processing of the returned survey data can vary.

Another example of a subset of the rules that may tend to change from case-to-case is in the technology data survey area. The evaluator organization specifies general priorities of the technology features and functions in the rules, but in some cases may also specify that if a candidate supplier does not provide a certain specific feature, the candidate should be dropped from consideration. In another case there may be no such stipulation, and all suppliers will accordingly be ranked together, even if one or more of them does not support key functions. In all cases, rules are inserted as parameters to drive the evaluation of the candidate supplier surveys.

It should be appreciated from the above that the present invention advantageously provides a highly organized, efficient, and automated system for evaluating. Other objects and advantages of the invention will become apparent upon reading the following detailed description and upon reference to the accompanying drawings.

DETAILED DESCRIPTION OF THE INVENTION

The claims at the end of this application set out novel features which applicants believe are characteristic of the invention. The invention, a preferred mode of use, further objectives and advantages, will best be understood by reference to the following detailed description of an illustrative embodiment read in conjunction with the accompanying drawings.

Figure 1:
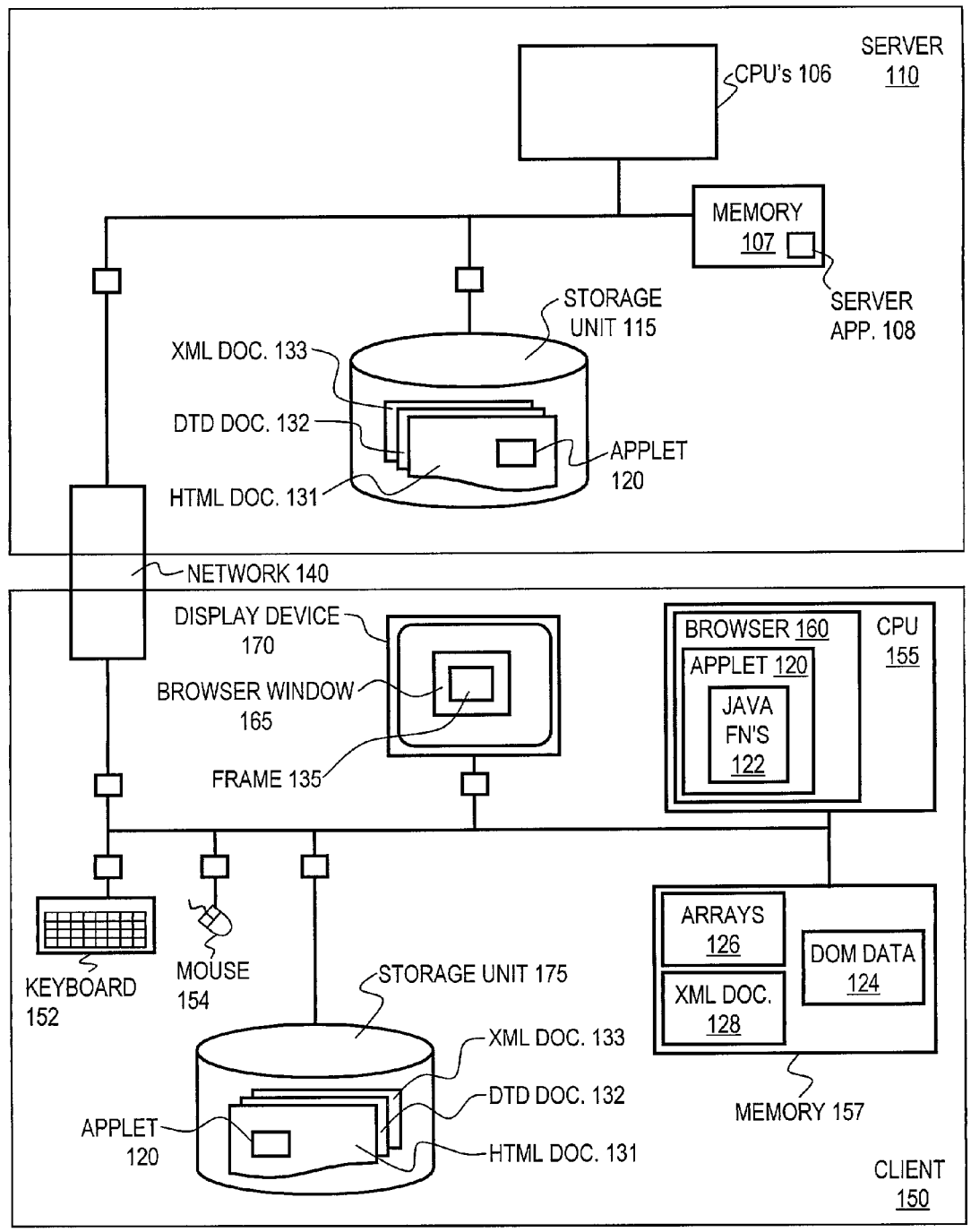
FIG. 1 illustrates a computer system that is generally applicable for an embodiment of the invention, and networking aspects of sending survey questions and receiving survey answers in the context of the World Wide Web, according to an embodiment of the invention.

FIG. 1 illustrates aspects of an embodiment of the present invention in the context of the World Wide Web, an open community of hypertext-enabled document servers and readers on the Internet. That is, client 150 is connected to a server 110 by a network 140, so that the client 150 can obtain data, such as hypertext markup language ("HTML") document 131, data type definitions ("DTD's), such as DTD document 132, and other data, such as extensible markup language ("XML") document 133 from the server 110, which has CPU's 106 and random access memory 107 for storing data and programming instructions in a server application 108 for fast access by the CPU's 106. In the embodiment shown, the data is stored by the server 110 in a first storage unit 115, and copies are delivered to the client's storage unit 175.

The client 150 executes a browser 160 program on its CPU 155, for rendering an image of the HTML document 131 in a frame 135 of browser window 165 on the client's display 170, which is a type of user interface. The client 150 of the embodiment depicted includes user input devices keyboard 152 and mouse 154. The HTML document 131 includes an applet 120, which has instructions in a Java format. (Java is a trademark of Sun Microsystems, Inc.) The Java applet is a non-standalone application in Java code that runs inside a browser such as browser 160. Among other aspects, Java is an object oriented, interpreted, dynamic programming language. This means that data and methods that operate on that data are collected as classes. The classes describe the state and behavior of respective objects and are arranged in a hierarchy so a subclass can inherit behavior from its superclass. Being an interpreted language, the Java applet is compiled as byte codes for a Java virtual machine, rather than native machine code. In this manner the applet is less platform dependent, since the applet can run on any platform to which the Java virtual machine has been ported. Being dynamic, classes of the applet 120 can be loaded into a running Java interpreter at anytime and then dynamically instantiated.

XML is a hierarchical data format, according to which data elements can be nested within other data elements and can have associated attributes. The XML document 133 in this embodiment is a survey document in which survey questions and answers are defined as XML data elements. That is, the XML file contains all the survey questions along with information about what type of answers are expected and if the answers are dependent on previous answers to previous questions. The questions and answers are included in the survey XML document 133 as strings of text surrounded by text markups, including tags that describe the data elements, and attributes that define associations among the data elements, e.g., questions and answers.

The DTD document 132 defines what elements may appear in the XML document 133, and defines contents and attributes for the elements. The applet 120 has Java functions 122 that parse data elements of the XML document 133 into a number of data arrays 126 stored in the client 150 memory 157. In connection with parsing the XML document 133, the Java functions 122 running on the client 150 validate the data in the XML document 133 responsive to the DTD document 132. Validating operates on the principle that everything not defined in the DTD document 132 is forbidden. That is, everything in the XML document 133 must match a declaration in the DTD document 132.

Responsive to receiving user inputted survey answers, the applet 120 updates the survey data, creating a document object model ("DOM") data structure 124 in memory 157. Then the applet 120 creates a responding XML document 128 in memory 157. The responding XML document 128 is for survey results and includes the user inputted answers. The responding XML document 128 is then sent back to the server 110.

Figure 2:
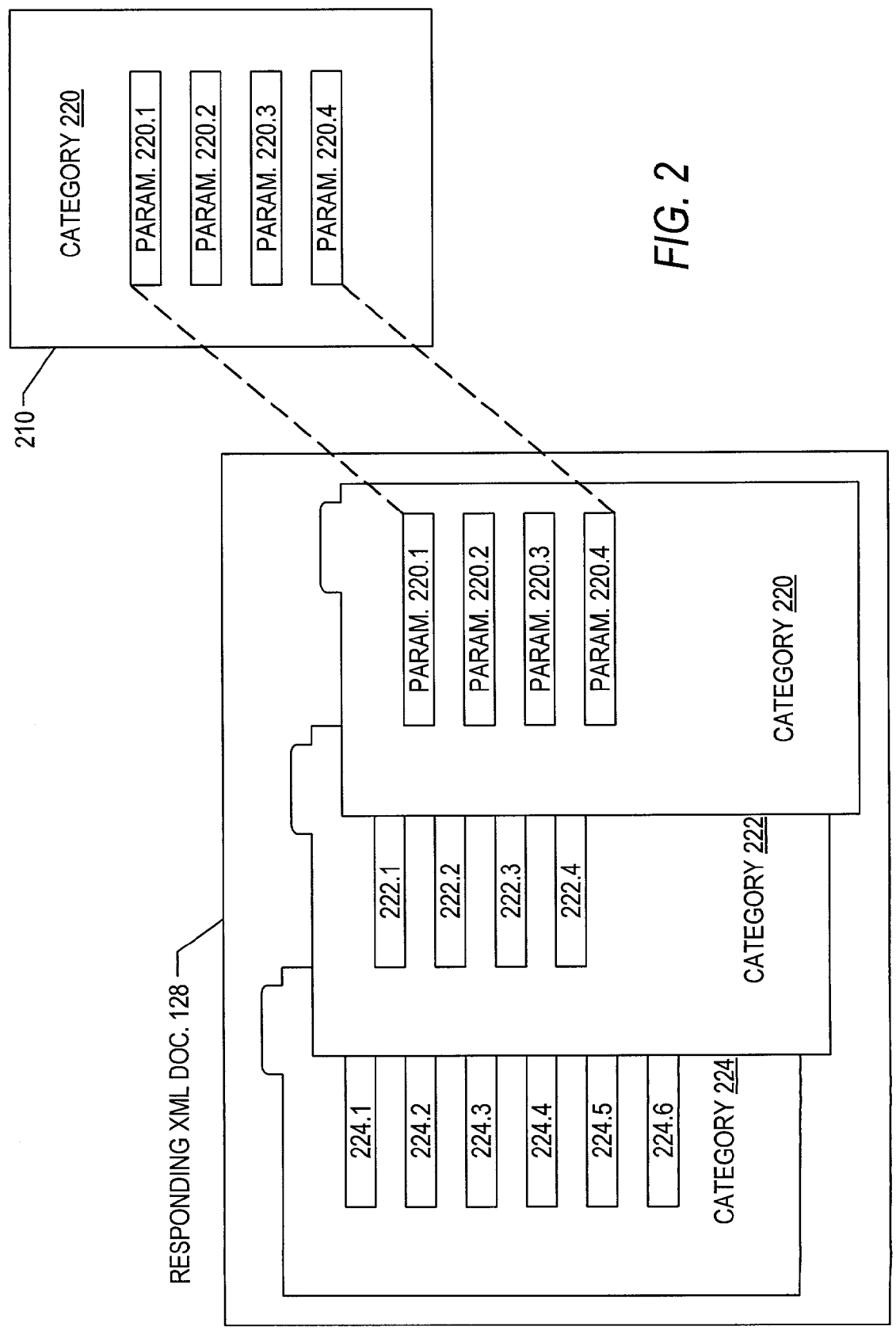
FIG. 2 illustrates a responding XML document having answers responsive to survey questions in numerous categories, and illustrates parsing of the answers (i.e., "data elements") in one of the categories of the responding XML document, according to an embodiment of the invention.

Referring now to FIG. 2, a responding XML document 128 is illustrated figuratively. The document 128 has answers in categories 220, 222, and 224. The answers (depicted as data elements 220.1 through 220.4 for category 220, 222.1 through 222.4 for category 222, and 224.1 through 224.6 for category 224) in the document 128 were gathered from a candidate supplier who received and responded to questions in a survey document, e.g., XML document 133 (FIG. 1).

An instance of the data elements 220.1 through 220.4 is also shown parsed from the responding XML document 128 for category 220. The server application 108 of the server 110 (FIG. 1), in memory 107 for example, has Java functions that parse the data elements of the responding XML document 128. In connection with parsing the XML document 128, the Java functions running on the server 110 validate the data in the XML document 128 responsive to the DTD document 132.

Figure 3:
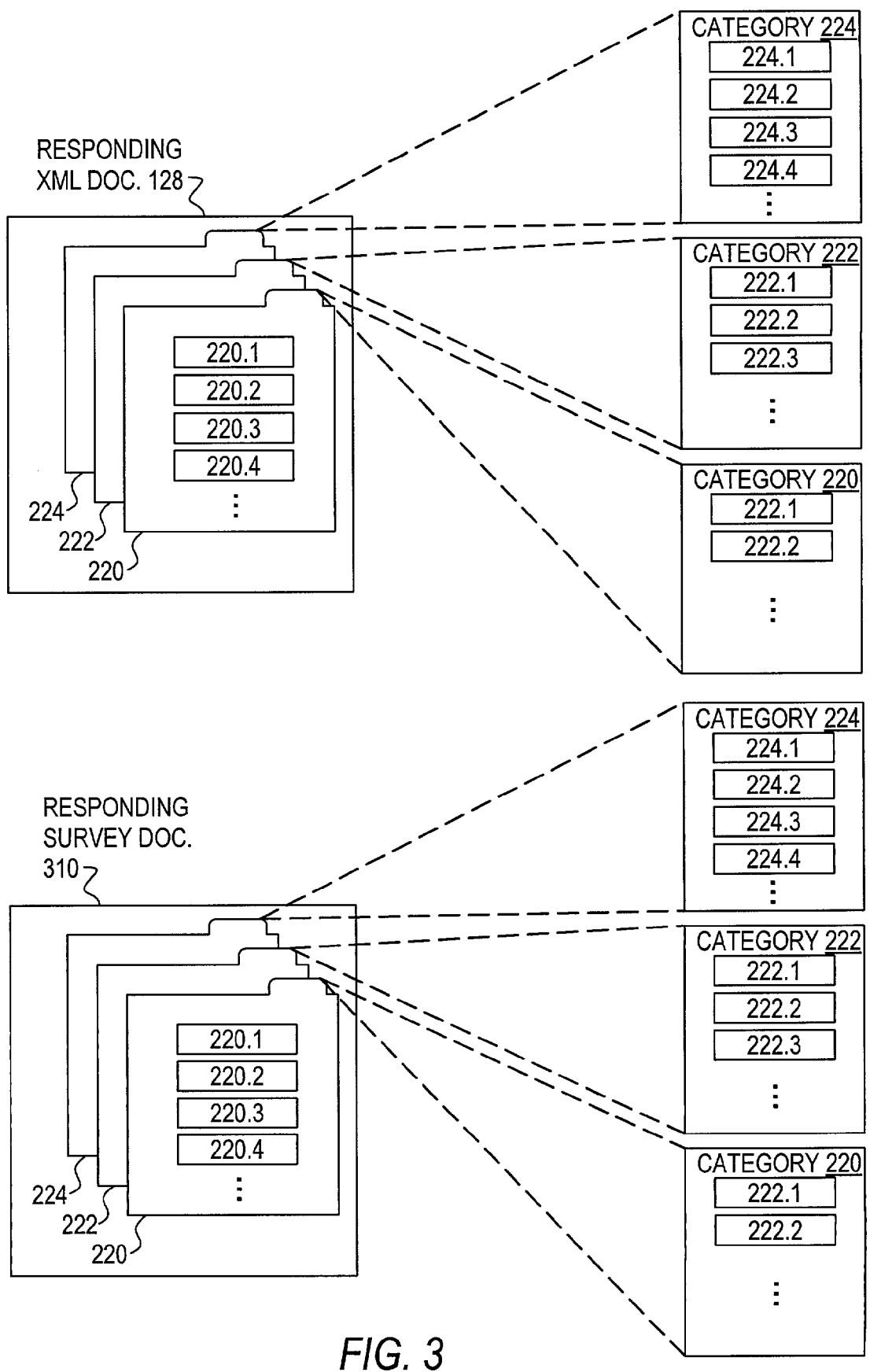
FIG. 3 illustrates numerous responding XML documents, each having data elements in numerous categories, and illustrates parsing of the data elements in all of the categories of the responding XML documents, according to an embodiment of the invention.

Referring now to FIG. 3, two responding XML documents 128 and 310 are explicitly shown and others are implied, each responding document having data elements in numerous categories. Shown parsed by the server 110 (FIG. 1) from the responding XML document 128 are the data elements 220.1 through 220.4 are for category 220, the data elements 222.1, etc. for category 222 and data elements 224.1, etc. for category 224. Likewise, shown parsed from another responding XML document 310 are the data elements 220.1 through 220.4 for category 220; data elements 222.1, etc. for category 222; and data elements 224.1, etc. for category 224.

In the embodiment depicted in FIG. 1, the server 110 is for a evaluator's organization and the responding XML document 128 is from an organization representing one of the candidate suppliers. According to the embodiment, survey questions are also sent to an evaluator computer system on a network, along with programming instructions for the evaluator computer system on the network. The instructions are for causing the evaluator computer system to return evaluator survey inputs, which may include answers to survey questions, as an evaluator responding document to the server on the network. The evaluator inputs are defined in a certain format as data elements included in the evaluator responding document. Document 310 in FIG. 3 contains the inputs from the evaluator's internal organization to the survey questions. These inputs in document 310 represent and define evaluator requirements or preferences of the evaluator's organization, so the answers in responses from candidate suppliers are evaluated by comparing them to the inputs in document 310.

Figure 4:
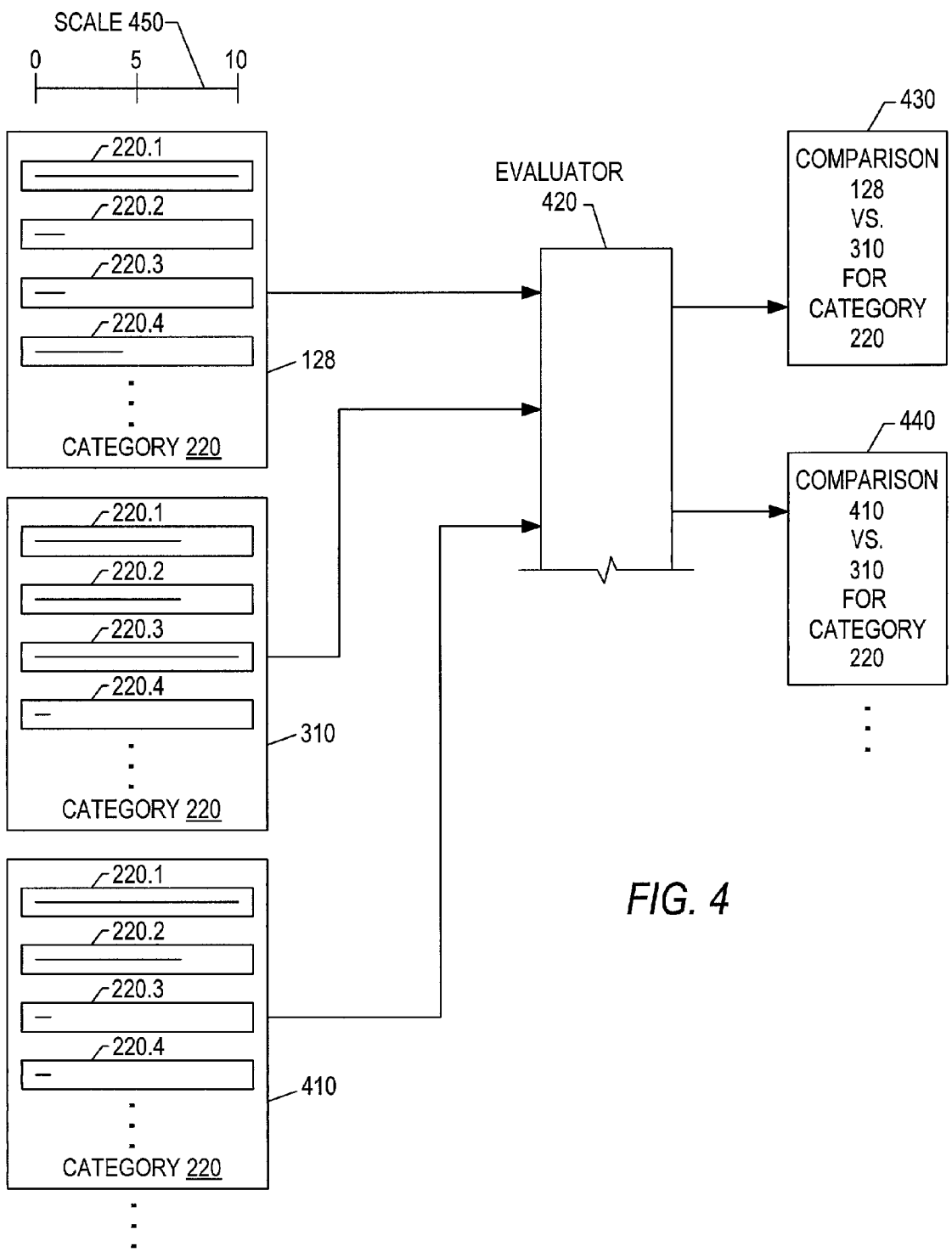
FIG. 4 illustrates quantifying the data elements for one of the categories of numerous responding XML documents and evaluating the data elements in the category to produce comparisons, according to an embodiment of the invention.

FIG. 4 illustrates a first stage of evaluating answers, i.e., data elements. The parsed data elements 220.1 through 220.4 are shown for category 220 of previously shown responding XML documents 128 and 310 and of a third responding XML document 410. The data elements are evaluated by an evaluator 420, which is a function provided by the server application 108 of the present invention, thereby producing comparisons 430 and 440. Comparison 430 indicates degrees of correlation among the data elements of category 220 for responding XML documents 128 and 310. Comparison 440 indicates degrees of correlation among the data elements of category 220 for responding XML documents 128 and 410.

As shown in the embodiment depicted here, the data elements 220.1, 220.2, etc. have been quantified by the server application 108. According to the embodiment, each answer given is reduced to a quantity on a scale 450 from 0 to 10. (The scale 0-10 is used for illustration. The scale could be some other scale, depending on required granularity.) For example, if a survey question asks a candidate supplier, "Do you do X?" And if it is desirable that the supplier does X, and the candidate supplier answers "yes," then the server application 108 assigns a value of 10 to the response. If the candidate supplier answers "no," then the server application 108 assigns a value of 0 to the response. Other answers are not so binary in nature. That is, they are susceptible to expression in terms of degrees, so that the server application 108 assigns them a value somewhere that may be between 0 and 10. Also, the answers may be expressed directly (from the original user input) as a quantity, so that the server application 108 does not itself have to transform the answer into a quantity.

Figure 6:
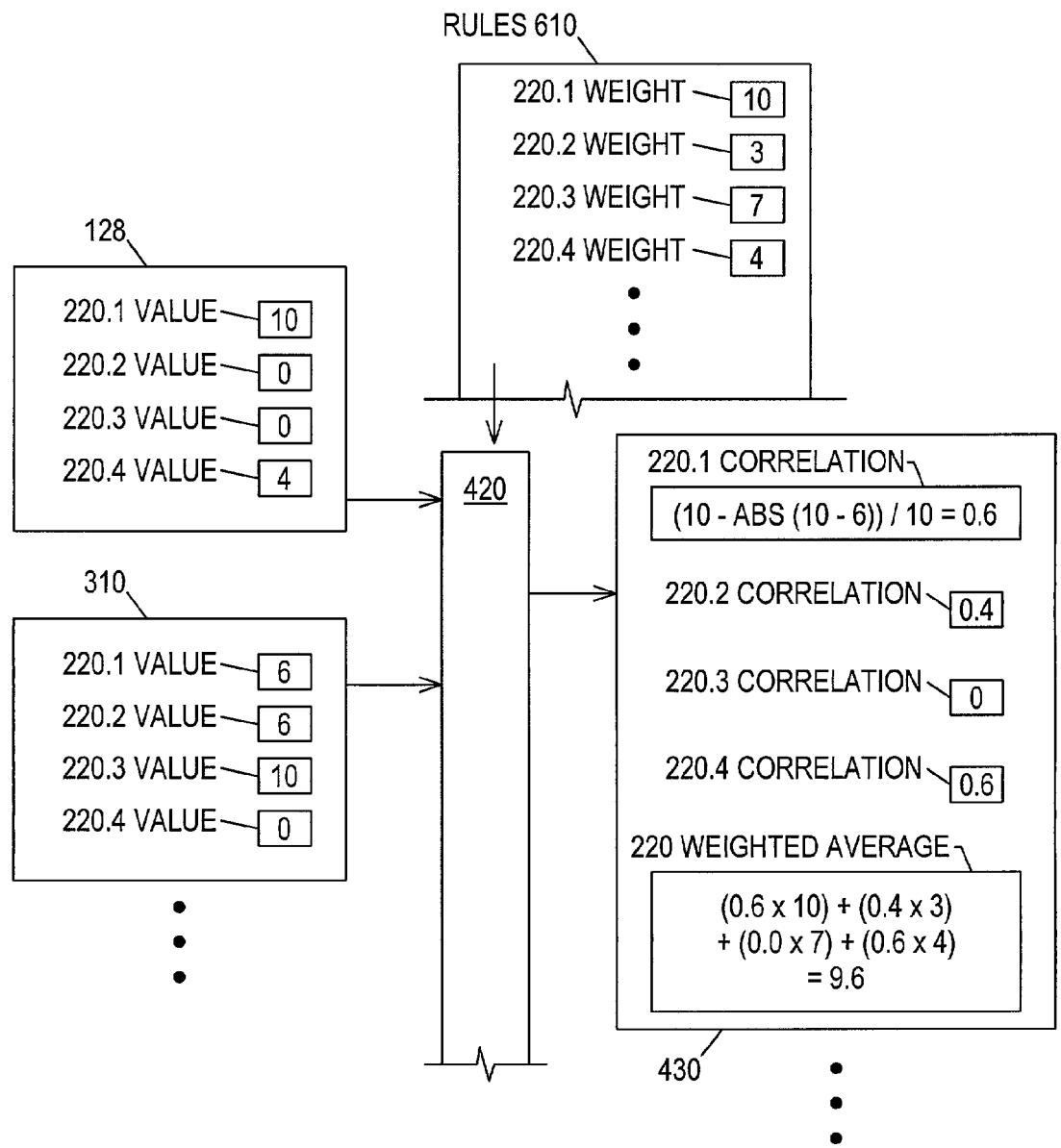
FIG. 6 illustrates application of rules by an evaluator function to produce a comparison between sets of corresponding data elements, according to an embodiment of the invention.

Referring now to FIG. 6, rules 610 are shown, including weights 220.1_weight through 220.4_weight, according to an embodiment. These rules 610 are input by the evaluator organization to the server application 108 and are applied by the evaluator function 420 to the values for the corresponding sets of data elements, such as data elements 220.1 through 220.4 (the data element values are shown as 220.1_value through 220.4_value). Applying the evaluator function 420 produces comparisons, including the comparison 430 between the corresponding data element sets for category 220 of the XML documents 128 and 310. As previously stated, the comparisons, such as comparison 430 shown, set out correlations among corresponding data elements.

The correlation between corresponding data elements may be expressed in a variety of ways. According to the illustrated embodiment, such a correlation is expressed as (10−(absolute value of the difference between corresponding data elements))/10. Thus, for example, if the required or preferred answer has a value of 10 and the answer given by a candidate supplier has a value of 10, the correlation has a value of 1. And if, for example, the required or preferred answer has a value of 10 and the answer given by candidate supplier has a value of 0, the correlation has a value of 0. The calculation of the correlation value 220.1_correlation is explicitly shown in FIG. 6. Resultant correlation values 220.2_correlation through 222.4_correlation are also shown.

The rules 610 also define how the individual correlation values are to be combined. In the illustrated embodiment for the comparison 430, for example, the correlations are combined as a weighted average. The calculation of this weighted average is explicitly set out in FIG. 6 as 220_weighted_average. In other embodiments the rules 610 specify certain minimum or maximum acceptable values for certain of the data elements. That is, the rules 610 specify a certain threshold requirement for a certain one of the data elements or combination of data elements. If a candidate supplier does not provide a certain specific feature, the candidate should be dropped from consideration.

In other aspects, the rules 610 specify a format for the comparisons output by the evaluators. In one embodiment, some or all of the data elements input to evaluators are not quantified, and the comparisons do not provide correlation values for such unquantified data elements, but rather set out such corresponding data elements in a contrasting fashion for manual analysis, such as in a graphic or side-by-side format, according to the formatting aspects of rules 610.

Figure 5:
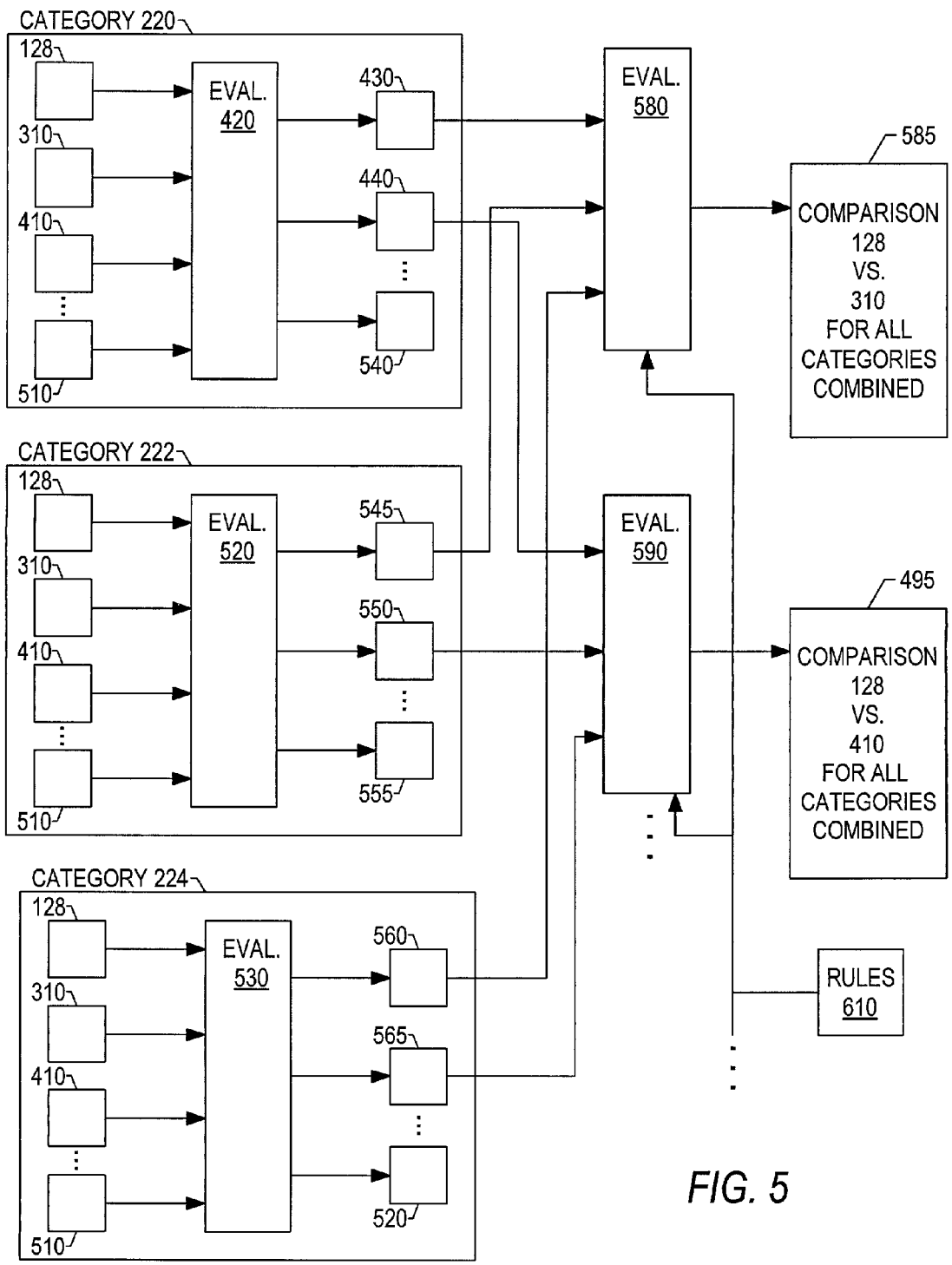
FIG. 5 illustrates, for numerous responding XML documents, evaluating both the data elements within respective categories and the data elements for all categories combined, according to an embodiment of the invention.

FIG. 5 illustrates evaluating data elements for all categories 220, 222 and 224. That is, for responding XML documents 128, 310, 410 and 510 the data elements in category 220 are evaluated by evaluator 420, the data elements in category 222 are evaluated by the evaluator 520, and the data elements in category 224 are evaluated by evaluator 530.

The evaluators 420, 520 and 530 produce respective comparisons responsive to data elements. More specifically, evaluator 420 produces comparison 430, setting out correlations between corresponding data elements of documents 128 and 310 for category 220; comparison 440, setting out correlations between corresponding data elements of documents 410 and 310 for category 220; and comparison 540, setting out correlations between corresponding data elements of documents 510 and 310 for category 220. Likewise, evaluator 520 produces comparison 545, setting out correlations between corresponding data elements of documents 128 and 310 for category 222; comparison 550, setting out correlations between corresponding data elements of documents 410 and 310 for category 222; and comparison 555, setting out correlations between corresponding data elements of documents 510 and 310 for category 222. Likewise, evaluator 530 produces comparison 560, setting out correlations between corresponding data elements of documents 128 and 310 for category 224; comparison 565, setting out correlations between corresponding data elements of documents 410 and 310 for category 224; and comparison 570, setting out correlations between corresponding data elements of documents 510 and 310 for category 224. (It should be understood, of course, that the function of evaluator 420, which produces three sets of comparisons 430 through 540, could be provided by three separate evaluators.)

The evaluators 580, 590, etc. produce comparisons responsive to respective comparisons 430 through 570 output by evaluators 420 through 530, and responsive to rules 610 (FIG. 6). Evaluator 580 provides comparison 585 for all of the categories 222 through 224 of document 128 with respect to document 310. Likewise, evaluator 590 provides comparison 595 for all of the categories 222 through 224 of document 410 with respect to document 310. Likewise, a third evaluator (not shown) provides a comparison (not shown) for all of the categories 222 through 224 of document 510 with respect to document 310. (It should be understood, of course, that the function of evaluators 580, 590 etc. could be provided by one evaluator.)

Although not explicitly shown in FIG. 5, it should be understood that the evaluators 420, 520, 530, 580, 590, etc. also each receive rules 610 (as shown for evaluator 420 in FIG. 6), and that their respective comparisons are also produced responsive to the rules 610. The rules 610 define how the category comparisons are to be combined into overall comparisons. In one embodiment the comparison 585, for example, is a weighted average of the weighted averages 220_weighted_averages, etc. of the comparisons 430, etc. In another embodiment, the rules 610 specify a certain threshold requirement for a certain one or more of the comparisons 430, 545 and 560. In one embodiment, selected ones or even all of the elements of combined comparisons 585, 590, etc. are not quantified, but rather are set out in a contrasting fashion for manual analysis, such as in a graphic or side-by-side format, according to the formatting aspects of the rules 610.

Figure 7:
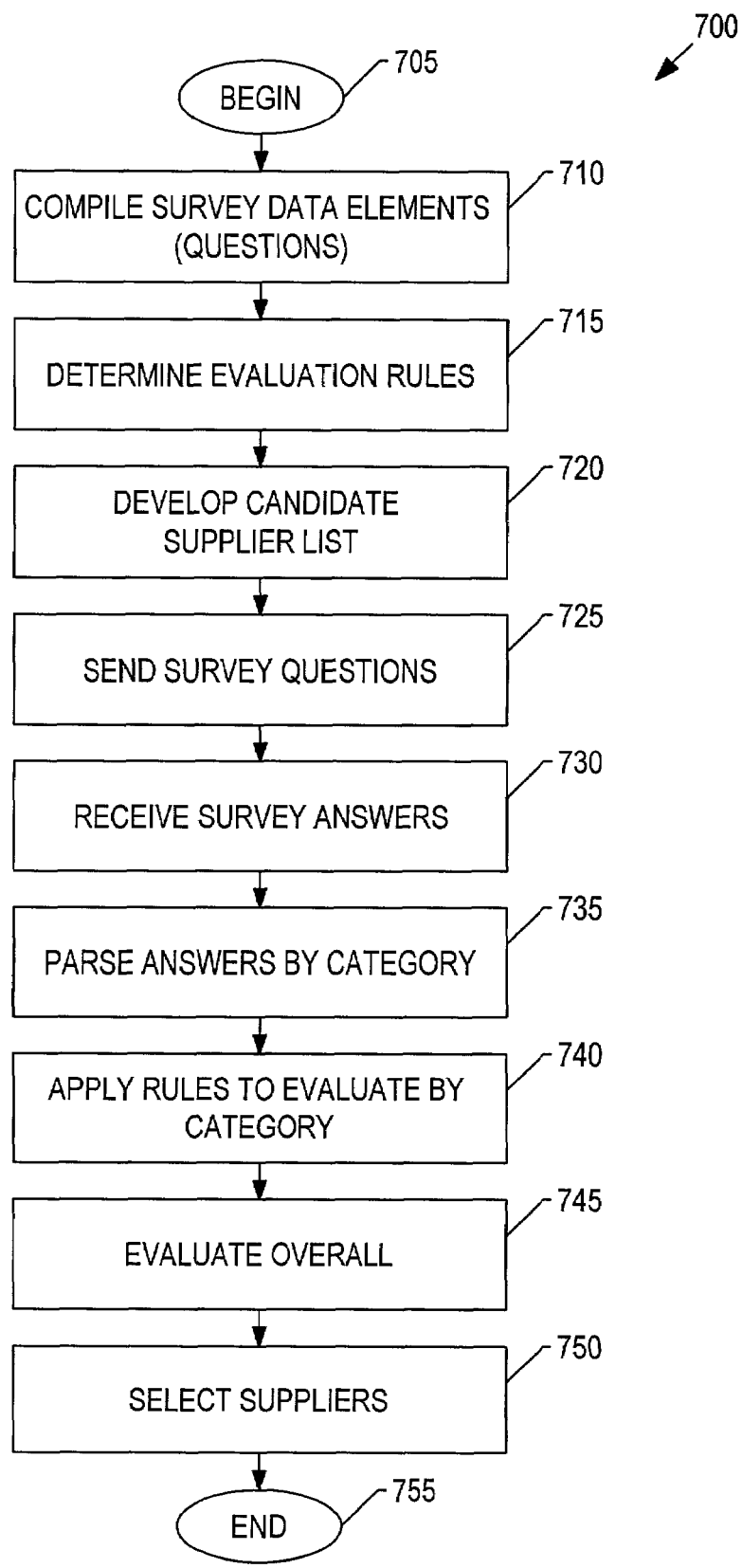
FIG. 7 illustrates method steps for certain aspects, according to an embodiment of the invention.

Referring now to FIG. 7, an algorithm 700 is shown for aspects of the invention, according to an embodiment. Certain of the steps of the algorithm 700 are performed by the server 110 (FIG. 1) responsive to programming instructions of the server application 108 (FIG. 1). (The steps which are performed automatically by the server application and those which are performed manually may vary according to the embodiment.) After beginning at step 705, the evaluator organization, at step 710, compiles survey data elements and inputs them as extensible markup language ("XML") document 133, along with data type definitions ("DTD's), such as DTD document 132 and places them on the server 110 for access by a client 150. The hypertext markup language ("HTML") document 131, including the applet 120, is also placed on the server 110 for rendering the survey data elements on the client 150 responsive to the XML document 133 and DTD document 132.

Also, at step 715, the evaluator organization determines evaluation rules 610 (FIG. 6), and makes them accessible to server application 108. Next, at step 720, the evaluator organization develops a list of candidate suppliers. Then, at step 725, the evaluator organization "sends" the "survey," that is, document 131 through 133, to the candidate suppliers. It should be understood that the survey may be effectively "sent" to a candidate supplier by merely notifying the candidate that the survey is available on the server 110, possibly also including a password in the notification, so that the survey will only be obtained by authorized candidates, and then relying upon the candidate to access the survey.

Next, at step 730, the evaluator organization receives survey answers, that is, responsive XML documents 128, etc., on its server 110. Note that the evaluator organization itself prepares and submits to the server 110 a survey answer, as previously explained. Next, at step 735, the server application 108 parses (by categories) the answers on the received documents 128, etc. Then, at step 740, the server application 108 applies rules 610 to evaluate the data elements of the answers category by category. Next, at step 745, the server application 108 evaluates the overall results supplier by supplier, and produces one or more reports setting out comparisons to the evaluator organization requirements (defined in the evaluator organization's survey answers). Next, at step 750, one or more suppliers are selected. Finally, the algorithm 700 ends, at 755.

It is important to note that while the present invention has been described in the context of a fully functioning data processing system, those of ordinary skill in the art will appreciate that the processes of the present invention are capable of being distributed in the form of a computer readable medium of instructions in a variety of forms and that the present invention applies equally regardless of the particular type of signal bearing media actually used to carry out the distribution. Examples of computer readable media include RAM, flash memory, recordable-type media, such a floppy disk, a hard disk drive, a ROM, and CD-ROM, and transmission-type media such as digital and analog communications links, e.g., the Internet.

The description of the present embodiment has been presented for purposes of illustration, but is not intended to be exhaustive or to limit the invention to the form disclosed. Many additional aspects, modifications and variations are also contemplated and are intended to be encompassed within the scope of the following claims.

What is claimed is:

1. A method for evaluating suppliers, the method comprising the steps of:

receiving sets of survey inputs from evaluators by a first computer system, the evaluators being associated with an organization seeking suppliers, the evaluator survey input sets being received as evaluator response documents, the evaluator response documents being XML formatted documents having evaluator requirements or preferences defined as XML formatted data elements, wherein the evaluator requirement or preference data elements provide quantitative values and the evaluator inputs define evaluator requirement or preferences as quantitative values for the respective data elements, such a evaluator requirement quantitative value indicating a required or preferred amount for the corresponding data element;

sending survey questions as a question set in a supplier survey document for receipt by a second computer system for a supplier organization and for displaying by a browser of the second computer system, wherein the supplier survey document is formatted as an XML document including information about answers for user input selection, the answer information including types of answers expected from the supplier organization and whether respective ones of the answers are dependent on respective other ones of the answers;

sending an HTML formatted document including programming instructions, the instructions being for receipt and execution as an applet by the browser of the second computer system, wherein the survey questions are rendered in the browser by the browser executing the applet, such that for the rendering of the survey questions the applet parses the questions and the answers into data arrays stored in memory of the second computer system, and wherein the browser executing the applet causes the second computer systems to return supplier survey answers to the first computer system as an XML formatted answer response document responsive to the applet processing user inputs and the survey questions, wherein the answers are defined as XML formatted data elements included in the answer response document, the answer data elements having strings of text surrounded by text markups, the text markups including tags describing the data elements;

parsing the answer data elements from the answer response document by the first computer system;

receiving, by the first computer system, rules input by the evaluator organization, wherein the rules define how supplier answers are combined with evaluator preferences or requirements and include weights for respective answers; and evaluating the data elements by an evaluator process of the first computer system, wherein the evaluating comprises:

comparing the data elements to corresponding ones of the evaluator requirements, wherein the comparing produces quantitative correlations between respective answer data elements and respective evaluator requirements or preference; and combining the correlations responsive to the weights and the received rules, wherein one of the correlations is defined as (10-(absolute value (one of the answer data elements—the answer data element's respective evaluator requirement or preference data element)))/10.

2. The method of claim 1, wherein the questions and their corresponding answers are organized in categories according to subject matter.

3. The method of claim 2, wherein the categories include development process, quality, enterprise, platform, operating system and environment.

4. The method of claim 1, wherein the method comprises the steps of:

sending programming instructions for receipt and execution by computer systems of the evaluators, the instructions being for causing the evaluator computer systems to return the evaluator survey inputs to the server.

* * * * *